May 24, 1960 P. DORFEL 2,937,679
MEAT CUTTING OR PROCESSING MACHINE
Filed Aug. 20, 1956 3 Sheets-Sheet 1

INVENTOR.
PAUL DÖRFEL
BY

May 24, 1960 P. DORFEL 2,937,679
MEAT CUTTING OR PROCESSING MACHINE
Filed Aug. 20, 1956 3 Sheets-Sheet 2
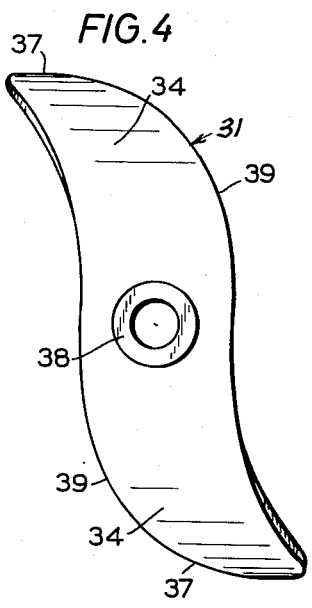
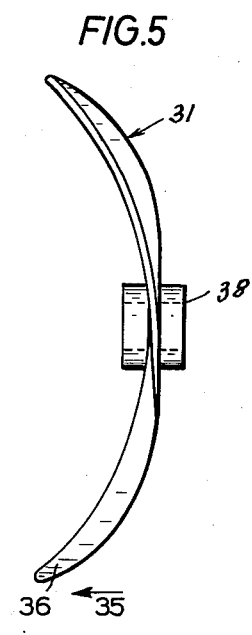
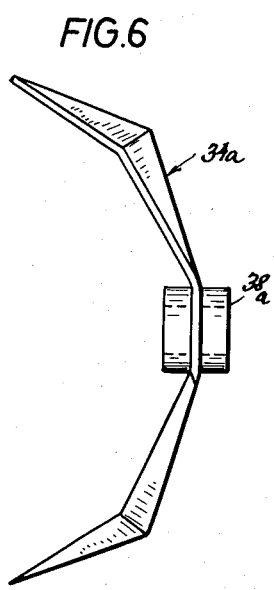
INVENTOR.
PAUL DÖRFEL
BY May 24, 1960           P. DORFEL           2,937,679
MEAT CUTTING OR PROCESSING MACHINE
Filed Aug. 20, 1956           3 Sheets-Sheet 3
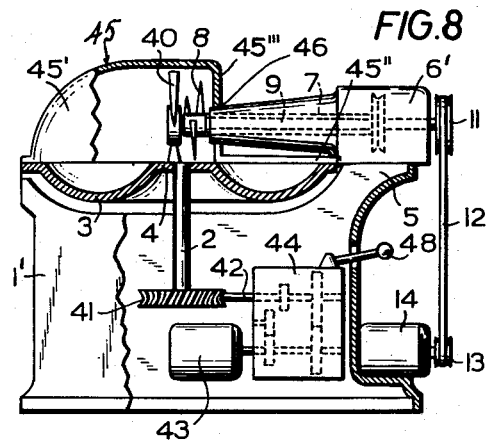
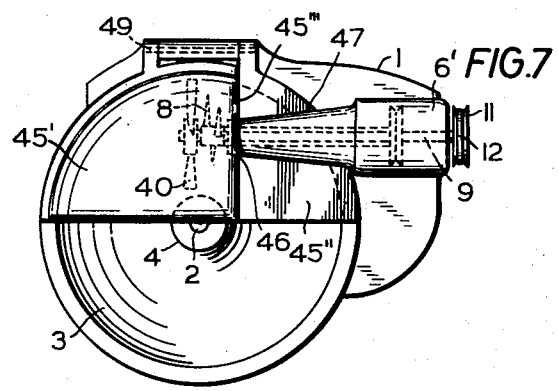
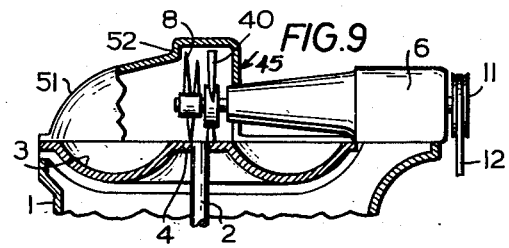
INVENTOR
PAUL DÖRFEL
BY

United States Patent Office 2,937,679
Patented May 24, 1960

2,937,679

MEAT CUTTING OR PROCESSING MACHINE

Paul Dörfel, Stuttgart, Germany, assignor to Willy W. Werner, Yale, Mich.

Filed Aug. 20, 1956, Ser. No. 605,090

Claims priority, application Germany Aug. 24, 1955

2 Claims. (Cl. 146—67)

This invention relates to meat cutters and more particularly to a meat processing machine.

It is one of the objects of the invention to provide means contributing to an improved economical assembly and operation of cutting, mingling and feeding devices in machines of the aforesaid type, in particular in meat cutter and like processing machines.

It is another object of the present invention to provide means affording the regulation of the cutting and comminuting operation of meat or like material so that the latter may assume a desired degree of consistency, since the meat may be changed to a more or less coarse or cubic structure, or may be more finely cut so that the meat may be transformed into a pulpy, pasty or semifluid condition.

The invention resides generally in the combination of a cutting blade or knife carrying head with mingling and feeding means arranged relative to the knife or cutting blade and at a regulatable distance therefrom.

It is, therefore, another object of the present invention to facilitate the tool assembly of meat cutters in such a manner that the material resting in the cutter pan will be accelerated transversely to the direction of rotation of the pan or trough by means of mingling and feeding tools so as to impart to the material a predetermined rotational spin or twist when it reaches the plane in which the knives or cutter blades operate. The mingling and feeding tools of the machine fulfill further the task of loosening the material to be cut before its passage through said plane of the operating knife blades so that heating of said material and consequently the danger of fat rendering will be reduced to a minimum.

According to one of the embodiments of the invention the combination mixing and feed tool has two wing-shaped blades having the ends thereof extending parallel to the direction of the rotational axis of the tool and in the direction of rotation of the cutter pan. The wing-shaped blades are angularly directed and crescent-shaped toward the rear and extend from the hub progressively at an angle of attack toward the outermost end.

Thus, a very important feature of the invention is that any material adjacent the wall of the cutter pan may be stripped off, lifted and thrown forwardly and inwardly toward the cutter knives.

While the knives in known meat cutter devices become only effective with a relatively small crescent-shaped portion thereof along an area of predetermined cross section, the particular formation of mingling and feed means according to the invention permits the material to be cut to be interspersed almost along the entire cross section in which the knives operate. The cross-sectional area at which the knives act on the material is therefore several times larger in the cutter machine constructed according to the invention.

According to another embodiment of the invention the mingling and feed tool may also be arranged ahead of and/or behind the knife blades.

The tools may either be arranged so that two tools are supported at one side of the cutter pan by a bearing, whereas the other mingling and feed tool is arranged at the opposite side of the cutter pan, whereby the other mingling and feed tool may be swung away from said pan for ready removal and for facilitating interchange-ability of the tools. All three tools may also be disposed so that the knife tool is fixed on a shaft extending from one extremity of the cutter pan to the other, this shaft being telescopically arranged within hollow shafts to each of which is connected a combination mingling and feed tool.

The above and other objects of the invention will become further apparent from the following detailed description, reference being made to the accompanying drawings, showing preferred embodiments of the invention.

In the drawings:

Fig. 4 is a front elevational view of a combination mingling and feed tool in the form of a double-wing blade embodying features of the invention and employed in the machines shown in Figs. 1 and 3.

Fig. 5 is a side elevational view of the tool seen in Fig. 4.

Fig. 6 illustrates a side elevational view of a tool in a modified form.

Fig. 7 is a top plan view of a meat processing machine embodying further features of the invention.

Fig. 8 is a side elevational view of the machine of Fig. 7, partly in section.

Fig. 9 is a modification of the machine of Fig. 8, only the upper part thereof being illustrated, with parts in section.

Figure 1:
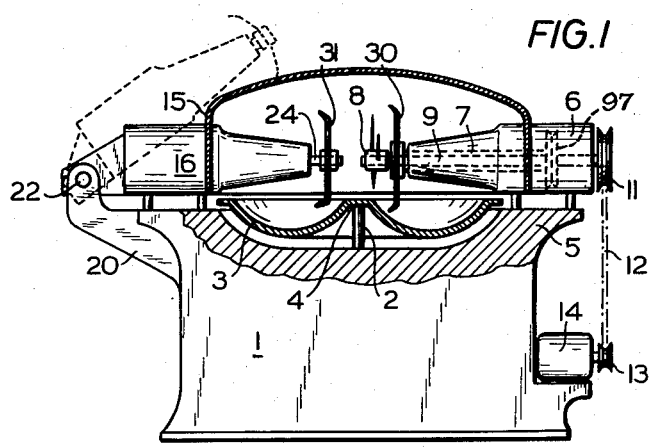
Fig. 1 is a side elevational view of a meat cutter machine embodying the invention, parts thereof being shown in section.
Figure 2:
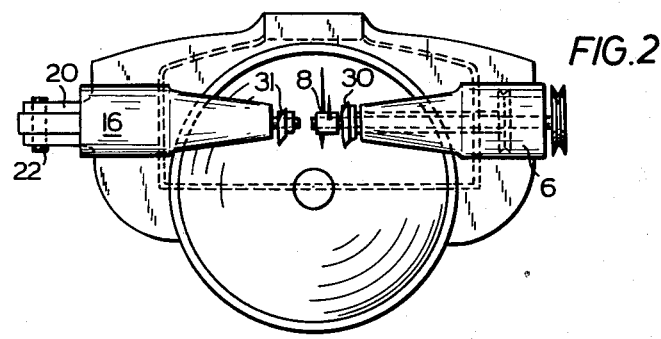
Fig. 2 is a top plan view of the machine seen in Fig. 1, with cover removed.

Referring now more particularly to the drawings, there is disclosed a base housing 1 for supporting the meat or like cutter arrangement which includes a driven vertical shaft 2 which is affixed to the elevated center part of the cutter receptacle or pan 3, which receives the material to be cut or processed. On a table-shaped extension or base 5 there is mounted a bearing housing 6 in which is journaled for rotation a hollow shaft 7, which is driven through a motor (not shown) by means of a sheave 97 disposed in the bearing housing 6. Within hollow shaft 7 there is rotatably supported a shaft 9 which carries on its projecting end a V-belt pulley 11, through which shaft 9 is driven by a motor 14 via a sheave 13 and V-shaped belt 12.

The aforesaid bearing housing is mounted by means (not shown) for displacement and pivotal movement in regard to its height as well as parallel to the plane of the pan or trough 3. In the embodiment shown the hollow shaft 7 carries a mixing and feed tool or device 30 on an end thereof, whereas shaft 9 journaled in said hollow shaft 7 supports a knife-head 8 on the end portion thereof.

Opposite to bearing housing 6 is disposed a bearing housing 16 which is pivotable about an axis 22 which is mounted in extensions 20 of the machine base housing 1. Within bearing 16 there is positioned a drive-motor (not shown) and on an end of the shaft 24 thereof is mounted a mixing and feed tool 31 spaced from the tool 30. The shafts are independently driven.

If this second-mentioned tool 31 is not in use, the latter may be swung together with the bearing housing about axis 22 to a position as seen in dotted lines in Fig. 1. A removable cover 15 overlies the tools 31, 8 and 30 and further a respective part of the bearing housings 6 and 16.

Figure 3:
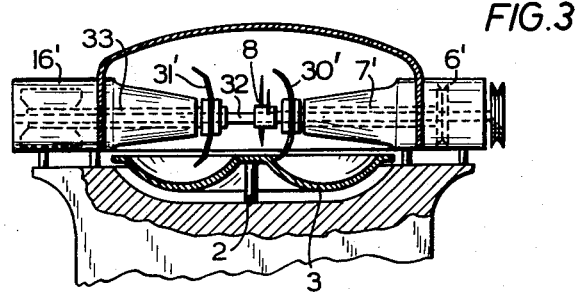
Fig. 3 is a fragmentary sectional view of a machine illustrating another embodiment of the invention.

According to the embodiment shown in Fig. 3 the knife head 8 is mounted on the end portion of a shaft 32 which is journaled at opposite sides of the cutter pan 3 in bearings 6' and 16'. On this shaft 32 there is journaled a hollow shaft 7' supported by bearing 6', which hollow shaft 7' carries a mixing and feed device 30'. Bearing 16' in this embodiment is not pivotable, but is adjustable in regard to its height and along a vertical plane passing through the axis of the cutter pan 3 so that adjustability and fixation may be had. Within bearing 16' on shaft 32 there is rotatably journaled a hollow shaft 33 which is driven by means of a motor housed within bearing housing 16', hollow shaft 33 carrying the mixing and feed tool 31'.

In both embodiments the bearings 6 and 16 or 6' and 16' project with their sheathing nearly to the hub of the tools 30' and 31'. Thus, it will be avoided that meat particles may be deposited on the shafts from which protein or albuminous substances may be removed due to the rotation of the aforesaid shafts, which removal would doubtlessly accelerate spoilage of sausages made from such meats.

In Figs. 4 and 5 there is shown an embodiment of the combination mixing and feed tool 30 or 31. In this embodiment tool 31 has two blades 34 to effect mixing and feeding of the material, the ends of the blades 34 being bent in the direction of rotation (arrow 35) of the cutter pan. The blade ends 36 are crescent-shaped toward the rear, whereby the outermost edge 37 is conformed to the curvature of the wall of the pan. Each blade is constructed to allow it to be bent at a predetermined angle to the hub thereof, whereby, in the embodiment shown, the effective angle increases from hub 38 toward the blade extremities. The edges 37, 39 facing the material to be cut are shaped and function as knife or cutting means.

The embodiment shown in Fig. 6 is distinguished from the tool illustrated in Figs. 4 and 5 in that the blades 34a extend already at a predetermined angle from hub 38a and relative to a vertical plane passing through the axis of the shaft and hub.

Instead of imparting to the tools 30, 8 and 31 an independent, individual drive, the gearing may be so arranged that the ratio of number of revolutions at least with respect to tools 30 and 8 may be adjusted to each other.

According to a preferred cutter arrangement in accordance with the invention the mingling and feed tool 30 rotates approximately with half the number of revolutions as that of the knife head. The number of revolutions of the tool 31 is then adjusted in accordance with the consistency and the desired degree of fineness of the material to be processed.

The tool 30 or 31 constructed in accordance with the invention functions to mix the material being worked upon. Besides this, the tool simulates the work performed by a human hand which takes the material to be cut from the edge or rim of the cutter pan toward the middle thereof and lifts it. This tool loosens the material to be cut immediately prior to the knife head and interspersedly feeds it across almost the entire cross-sectional area along the path described by the knives. This cross-sectional area within which the knife blades operate is quite large. If the tool 31 is driven in a direction contrary to the knife blade rotation or relatively slower than the rotational speed of the cutter pan, then the material to be cut is retained and dammed up before the mingling and feed tool 31, thereby giving the knife blades an opportunity to act on this material relatively longer, so that a kind of pasty meat substance or mass results. If, however, a coarse or cubic-shaped material is to be obtained, then the tool 31 is driven in substantially same direction of rotation as the knife blades, so that the cut material will be advanced and transported in addition by the aforesaid mixing and feed tool 31. Corresponding to a more or less liquid or rather firm consistency of the material the aforesaid mingling and feed tool is disposed at a greater or shorter distance from the cutting or knife blades.

All the tools are fixedly arranged on their driven shafts so that they may easily be interchanged or replaced by other tools.

All three tools may also be disposed so that the knife tool is fixed on a shaft extending from one extremity of the cutter pan to the other, such shaft carrying hollow shafts to each of which being connected a combination mingling and feed tool.

Referring now more particularly to the embodiment shown in Figs. 7 and 8 there is disclosed a vertical shaft 2 to which is keyed a toothed or worm wheel 41, which cooperates with a worm (not shown) fixed on shaft 42. The shaft 42 is driven from a motor 43 via a transmission gearing 44 which permits a change of direction of rotation of the cutter pan or receptacle 3 and also affords the application of several stepped speeds in both directions of rotation for the purpose of adjustability. In order to regulate the direction of rotation of the cutter pan and to control the individual steps of speeds a regulator arm 48 may be employed and actuated, which projects through a slot (not shown) of the base housing 1' toward the outside of the meat cutter machine.

Above cutting tools 8 and 40 and the cutter pan half adjacent said tools extends a cover 45. This cutter cover includes a hood-shaped curved portion 45' and a relatively flat lower extension portion 45''. The hood-shaped portion 45' positioned above the tools includes further adjacent the knife head 8 a vertical wall 45''' which separates the tools from the adjacent space taken up by the bearing housing 6'. Remote from this bearing housing 6' the hood-shaped cover 45' possesses a curvature which is complementary to the downwardly curved bottom of the pan which gradually becomes flat and runs level with the upper outer edge of the pan 3. The vertical wall 45''' has a passageway or cutout 46 through which projects the forward part of the bearing housing 6' and reaches into the space defined by the hood-shaped cover 45'. Connected to wall 45''' is the aforesaid relatively flat extension 45'' which projects below and to both sides of the bearing housing 6'. The cutter cover 45 is pivotally journaled about a pin 49 on base housing 1' (Fig. 7).

The distance of the wall 45''' from the first knife of the knife head 8 may be so chosen that the space suffices in order to comminute the meat parts thrown or fed into said space which is defined by the wall and the knife in which said meat parts are progressively subjected to friction but remain cohesive, as it is desirable in the manufacture of cooked or scalded sausages. The distance of the end plate or wall 45''' from the knife head 8 may also be varied (larger), the distance, however, should always be small enough so that through this wall or plate a sufficient damming effect will be imparted to the material to be cut when it reaches the knife head 8 and when the cutter pan is rotated from the knife head in the direction towards said wall 45'''.

According to the invention next to the baffle wall 45''' cutter or knife means 8 and remote from said wall there are arranged the mixing and feed tools 40. The sequential disposition of these tools may also be so carried out that the mixing and feed tool is disposed between the knife tool 8 and the baffle wall 45'''. These tools may also be arranged, instead of on separate shafts 7 and 9, on a common shaft, as hereinabove already mentioned. Finally the meat cutter machine according to the invention may be so arranged in regard to the baffle plate or damming wall and/or to the reversing drive mechanism for the cutter pan that an assembly of tools is employed, wherein the knife tool is disposed between two mixing and transporting or feed tools.

In accordance with the embodiment shown in Fig. 9 the disposition of the tools 8 and 40 is so selected that adjacent wall 45 there is arranged the mixing and transporting tool 40 which is followed by knife or cutting means 8.

In accordance with this latter embodiment the cover 51 includes a ledge 52 with a groove extending at right angles which ledge may have an average height of about 2 cm. This ledge extends parallel to the plane in which the knife extends between the two base points of the curvature of the cover. The aforesaid ledge 52 forms the end of a half cylindrical curved cover 51 which encases the tools.

The mixing and transporting tool may have a plurality of wings or blades and can also be formed like a screw conveyor.

From the aforesaid disclosure having reference to various embodiments of the invention it will become clear, that the dished cutter pan 3 may be selectively driven in either direction of rotation so that the food or meat material to be cut or processed may be first brought into contact with said knife means or first with said mixing and feed tool, selectively.

The reversibility of direction of rotation of the dished cutter pan is advantageous in particular at the start of the cutter operation, because it facilitates to choose the direction of rotation in a manner that the meat pieces which are not as yet cut and may even be frozen come first of all and directly in contact with the knife blades when placed in the cutter pan and only subsequently with the mixing tools. Thereafter, the direction of rotation of the cutter pan may be reversed, so that the material to be processed before reaching the plane of knife operation is first worked upon by the mixing and feed tool and may then be advanced by the latter into and interspersed in the plane of the knife blades.

Due to this reversibility, of the direction of rotation of the cutter pan, it will be safely avoided that the mixing tools become damaged due to the impact caused by relatively large frozen meat pieces.

Since the number of revolutions and the direction of rotation of such mixing tools may be adjustable and regulatable, the mixing tool may be so adjustably positioned that it furthers the working operation in the direction of rotation of the cutter pan.

The invention may also be realized by constructing the meat cutter machine with a cover 45 or 51 which encases the tools and the adjacent half portion of the pan 3. In such instance, the cover is provided at one side of the tools with a wall which extends parallel to the plane of the knife blades and closes off the space surrounding such tools, while on the opposite side of the tools a free space is formed, which is defined by a curved portion of the cover.

A particular advantage of this latter cutter machine arrangement resides in the fact that in such machines not only pasty or pulpy material may be obtained, which is generally used for scalded sausages, but also small cut pieces, which are worked into raw or uncooked sausage, without requiring any interchangeability of the machine parts and the arrangement of special partitions in and below the cutter cover. The transformation of the working conditions of the machine from cooked sausage production to raw sausage manufacture may thus be easily and readily attained by reversing the direction of the cutter pan movement.

Meat cutter machines according to the invention may be equipped with a single handle 48 to effectuate changeability of the machine to different operations thereby performing the work of several machines heretofore required in a plant. Best and favorable conditions may therefore be provided for each individual operational step which takes into consideration the respective working on the meat. In known machines which generally necessitate time consuming transformations for such purpose were never suitable for various working operations, since they were built to perform a predetermined working operation which was the most favorable one for the prevailing circumstances.

If the direction of rotation of the cutter pan is selected whereby the latter moves the material to be cut away from the vertical baffle wall toward and in the direction of rotation to the cutting tools, then the material will be smoothened through its contact with the lower edge of the cover wall and the tools grasp the material only on a relatively small angular area during its passage, so that coarsely cut meat material suitable for raw sausages will result therefrom. If, however, the direction of rotation of the pan is reversed, so that the material is guided away from the tools toward the baffle wall 45''', then the material is subjected thereat to a damming effect caused by the action of the mixing and feed tools, as well as of the knife blades opening up the material adjacent said baffle wall. This damming effect may extend the entire height of the aforesaid space, so that the tools agitate the material along a much larger angular area of operation during rotation and consequently a very fine cut and readily binding, cohesive sausage substance is obtained which is suitable for cooking purposes.

As above mentioned the mixing and feed tool may be disposed on one side of the knife blade means which are remote from the vertical baffle wall of the cutter cover as seen in the direction of the rotation of the cutter pan. During the direction of rotation of the cutter pan most favorable for the manufacture of cooked sausage substance, the material to be processed is first brought into contact with the mixing and feed tools, is seized by the latter and is then thrown into the plane of operation of the knife blade means over a cross-sectional area corresponding substantially to the entire cross-section in which the knife-blades become effective.

Due to such arrangement of the mixing and feed tools, the angular area of operation will be further enlarged due to the baffling effect obtained through the cutter cover wall so that the knives will act on the material more favorably and almost during their complete revolution, which is in particular applicable when using fibrous or tendinous meat, which has to be comminuted within the shortest time possible and must present very good binding properties.

This machine herein disclosed may be further modified in that the vertical wall of the cutter cover extending perpendicular to the direction of rotation of the cutter pan is so shaped that parts of the thus amassed or dammed material, preferably its coarser parts revert to the plane in which the operation of the knives takes place.

According to the invention the sequence of the mixing and feed tools is chosen that the latter are arranged between the knife blades and the wall of the cutter cover which latter extends perpendicular to the direction of rotation of the cutter pan. The advantages of such arrangement stems from the fact that if the mixing and feed tool is properly chosen and also the number of revolutions thereof, it will be avoided that the material enters into the lower operational area of the knife blades at greater speed than in the upper operational area in which the material is still held by the baffle plate or wall, against which the material rests and remains there somewhat longer. Due to the selection of more suitable operational conditions it may be attained that the speed at which the material reaches the operational plane of the knives is substantially uniform over the entire cross-section, so that an especially remarkable uniformity of fineness of the material can be observed.

The invention is capable of being further developed by the provision of a special formation of the cutter cover at a location remote from the mixing and feed tool, but adjacent the knife tools, which assumes the character of a ledge which is grooved at right angles to the remainder of the cover. Portions of the material to be cut which will be thrown into the plane of the knife tools by means of the mixing and feed tools for contact with the knife tools, but without being seized by the latter first hit this ledge and are then dropped into the plane of operation of the adjacent knife tools.

Thus, it will be prevented that on this side of the knife tools, portions of the material to be cut will be guided away through the rotating pan and would not be subjected to the knife blade operation for comminuting purposes.

According to the invention, the direction of rotation of the power drives for the tools 8, 30 or 8, 30', 31' or 8, 40 may be simultaneously changed together with the direction of rotation of the power drive for the cutter pan 3. The advantage of such arrangement resides in the fact, that the tools employed in the respective direction of rotation will rotate to exert various desirable effects on the food and like material to be processed.

The drive for the cutter pan may include a transmission gearing for several stages of speed and further built-in means for changing or reversing the direction of rotation of said pan.

The meat cutter machine according to the invention may also be equipped with a reversing switch for changing polarity of the field of the motor drive, in such manner that the direction of rotation for the drive of the cutter pan may be reversed.

The above reversible drive for the cutter pan to move same in either direction of rotation is preferably realized in such meat cutters in which the cover thereof includes baffle means oriented substantially perpendicular to the direction of rotation of the cutter pan.

But such reversible drive for the cutter pan may also be realized with great advantage in other even known meat cutter machines in which the disposition of the tools is asymmertical, for instance, in meat cutter machines, which are equipped with a mixing tool and a knife tool, but have no baffle plate or wall for damming purposes or in meat cutter machines provided with baffle means and cutting or knife tools but lacking the presence of mingling and feed tools.

While there are shown and described herein certain specific structures embodying the invention, it will be manifest to those skilled in the art that various modifications and rearrangements of the parts may be made without departing from the scope of the invention, and that the same is not limited to the particular form herein shown and described, except in so far as indicated by the appended claims.

Having thus described the invention, what is claimed as new and desired to be secured by Letters Patent is:

1. In a machine for cutting and mixing of food stuffs; a base frame, a dished pan rotatably supported on said base frame about a vertical axis, a pair of coaxial shafts overlying said pan and having their axes lying in a plane substantially normal to said vertical axis of said pan, mixing and feed tool means connected to the respective ends of said pair of shafts and spaced from each other, a first shaft of said pair of shafts being pivotally supported on said base frame, the second shaft of said pair of shafts being hollow, means for independently driving said shafts to facilitate relative rotation of said mixing and feed tool means, a third shaft telescopically disposed for rotation in said second shaft and axially aligned with the latter, said third shaft having an end portion extending outwardly of and beyond said second shaft, and a knife-head secured to said end portion of said third shaft and disposed between said mixing and feed tool means.

2. In a machine for cutting and mixing of food stuffs according to claim 1; said mixing and feed tool means comprising blades having a curvature in the same direction.

References Cited in the file of this patent
UNITED STATES PATENTS

| | | |
|---|---|---|
| 1,655,785 | Guelden | Jan. 10, 1928 |
| 1,851,583 | Johnston | Mar. 29, 1932 |
| 2,806,497 | Dorfel | Sept. 17, 1957 |

FOREIGN PATENTS

| | | |
|---|---|---|
| 806,317 | France | Sept. 21, 1936 |
| 167,783 | Austria | Feb. 26, 1951 |
| 847,113 | Germany | Aug. 21, 1952 |
| 173,993 | Austria | Feb. 10, 1953 |
| 1,039,259 | France | May 13, 1953 |
| 1,069,892 | France | Feb. 17, 1954 |
| 1,088,437 | France | Sept. 8, 1954 |
| 1,106,915 | France | July 27, 1955 |